Aug. 4, 1942.    E. F. JIMMES    2,291,900
SLEEPING BERTH FOR MOTOR VEHICLES
Filed Aug. 27, 1940    3 Sheets-Sheet 1
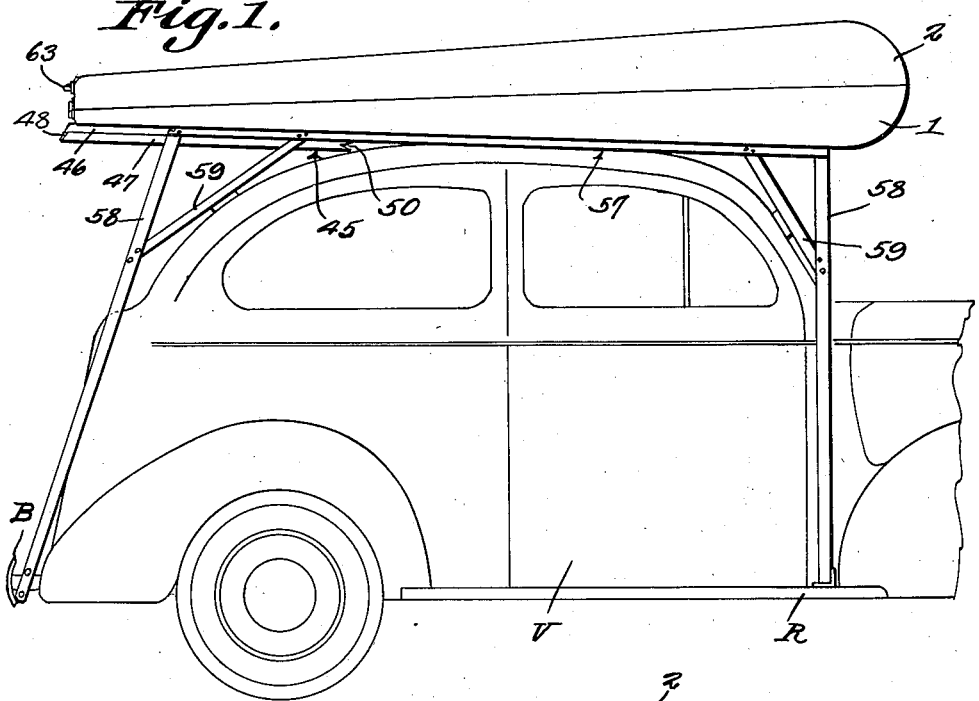
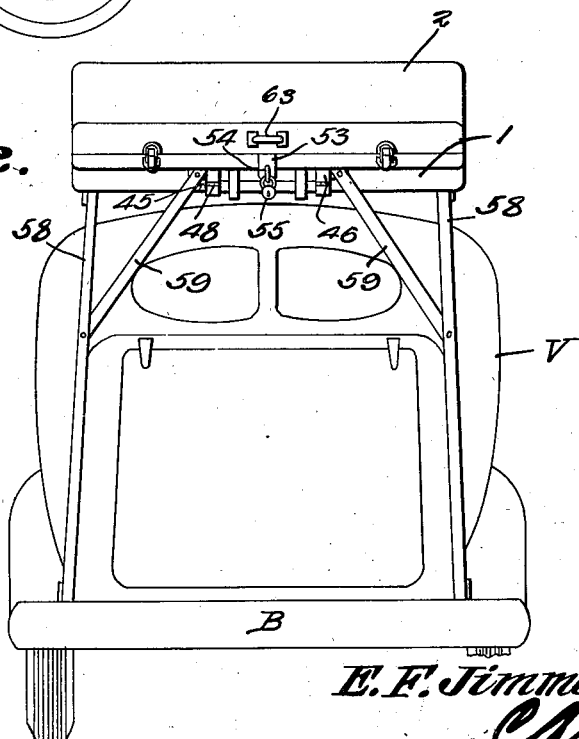
E. F. Jimmes INVENTOR.
BY *C. A. Snowles*
ATTORNEYS.

Aug. 4, 1942.  E. F. JIMMES  2,291,900
SLEEPING BERTH FOR MOTOR VEHICLES
Filed Aug. 27, 1940  3 Sheets-Sheet 2
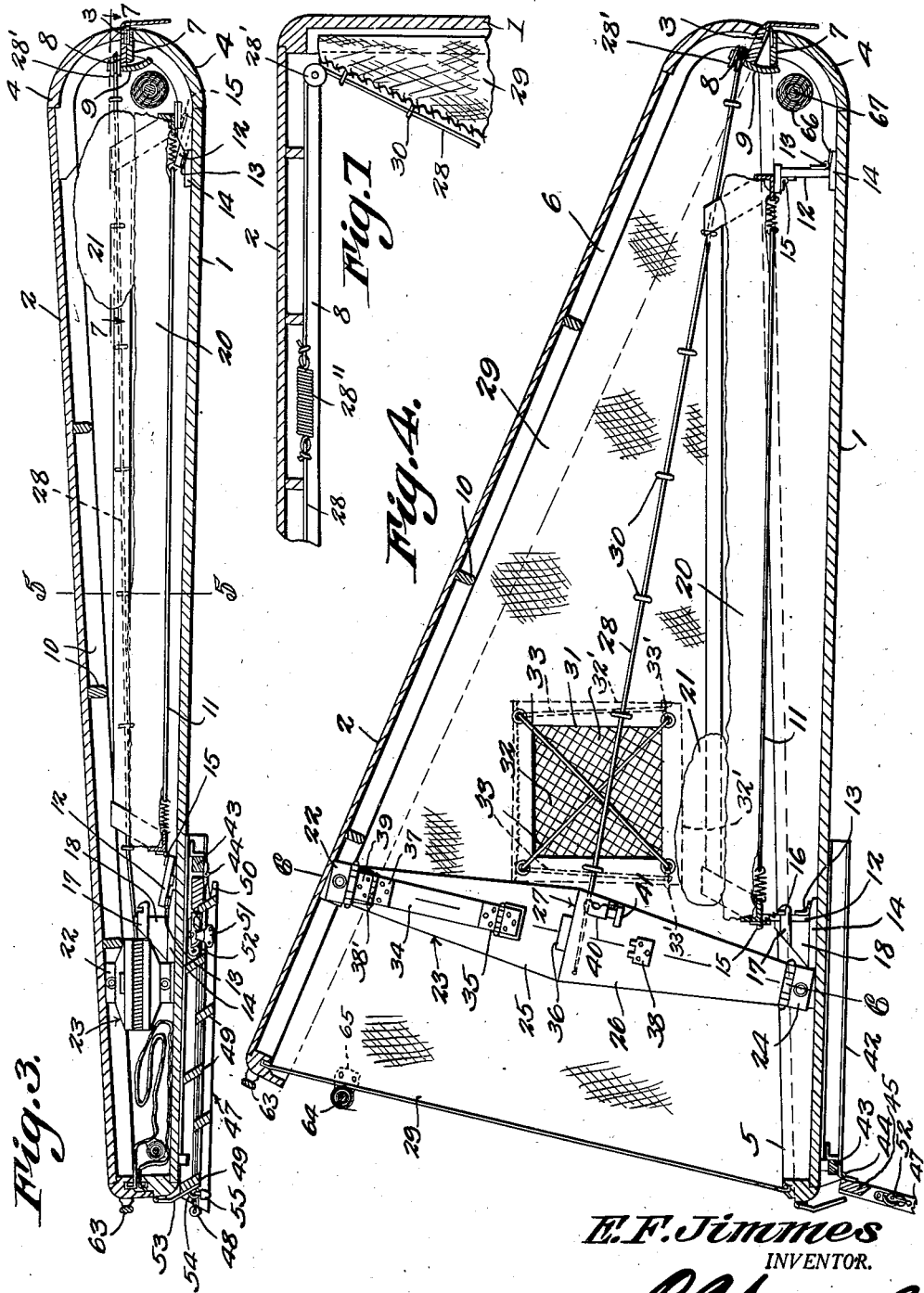
E. F. Jimmes
INVENTOR.
BY Abnor & Co.
ATTORNEYS.

Aug. 4, 1942.     E. F. JIMMES     2,291,900
SLEEPING BERTH FOR MOTOR VEHICLES
Filed Aug. 27, 1940     3 Sheets-Sheet 3

Patented Aug. 4, 1942

2,291,900

UNITED STATES PATENT OFFICE 2,291,900

SLEEPING BERTH FOR MOTOR VEHICLES

Earl F. Jimmes, Milwaukee, Wis.

Application August 27, 1940, Serial No. 354,420

7 Claims. (Cl. 135—1)

This invention relates to a sleeping berth designed primarily for use in connection with automobiles, one of the objects being to provide a structure of this character in the form of a complete unit which can be mounted readily on the top of a vehicle body, the construction being such that minimum wind resistance will be encountered thereby while the vehicle is in motion.

Another object is to provide a berth of this character which, when not in use, can be closed to have the appearance of a streamlined case, the said device including a housed bed spring, curtains, etc., all of which can be quickly positioned for use when the case is opened.

A still further object is to provide the case with a means for supporting the cover in raised position so as to provide ample space for the users.

A still further object is to provide the structure with side curtains which will fold inwardly automatically when the case is closed and will assume positions as side closures when the case is opened.

Another object is to provide a berth which, because of its shape, will not obstruct the vision of the driver of the vehicle and, because of its location, will not interfere with the use of the trunk usually found at the back of the body.

Another object is to provide a berth which can be set up quickly by one person and which, by reason of its construction, affords complete protection to the occupant from moisture.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings:

Figure 1 is a side elevation of a portion of an automobile equipped with the present improvements, the berth being shown closed.

Figure 2 is a rear elevation of the structure shown in Figure 1.

Figure 3 is a central longitudinal section through the closed unit, its supports being removed.

Figure 4 is a similar view showing the berth opened for use.

Figure 7 is a fragmentary sectional plan view of a portion of the structure the section taken on the plane indicated by the line 7—7 on Figure 3.

Figure 5:
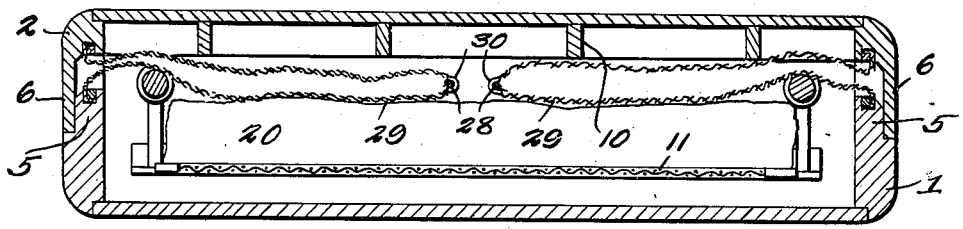
Figure 5 is a section on line 5—5, Figure 3.

Referring to the figures by characters of reference, 1 designates the box-like bottom portion of the unit to the front end of which is hingedly connected the lid or cover portion 2, the point of connection being indicated at 3. These two sections are so shaped as to provide a substantially cylindrical front end 4 when the unit is closed, the top and bottom converging rearwardly as shown so as to give a streamlined effect. The bottom section 1 has upwardly extending flanges 5 along the sides and back end thereof and these flanges are adapted to be lapped by depending flanges 6 on the sides and back end of the cover so that when the cover is in closed position, there is no danger of rain seeping between the parts where they are in lapped relation. The two sections 1 and 2 are provided with inwardly extended flanges 7 and 8 at their forward ends, the flange 7 carried by the bottom section 1 providing a seat for the flange 8 when the two sections are closed together. A shield 9 extends from one of the flanges and laps the other flange so as thus to provide a closure when the cover is in any position relative to the base section.

Both the base section and the cover can be constructed in any suitable manner. For example, and as shown in the drawings, the cover can be provided with a reenforcing framework 10 and, if the base section is not made of sufficiently strong material, it could likewise be provided with a similar reenforcing frame.

A spring mattress 11 is supported at its ends by legs 12. These legs are all hingedly connected at 13 to the bottom section 1 so as to swing downwardly in the direction of the rounded end 4 of the unit. When swung to upstanding positions, as shown for example in Figure 4, these legs are caused to abut against supporting surfaces 14 so that they cannot swing past their dead centers. The upper ends of the legs are hingedly connected at 15 to the ends of the mattress frame 11, these hinges being located oppositely to the hinges 13 so as to allow the mattress frame to move downwardly onto the bottom of section 1 and also to move upwardly and rearwardly away from the bottom of the section. In Figure 4 the mattress frame has been shown in its raised position and when thus located, spring-restrained latch levers 16 carried by the legs nearest the back end of the unit, engage keepers 17 which project from brackets 18 on the bottom of section 1. Obviously by lifting the latch levers 16 the legs 12 are free to swing downwardly and forwardly relative to the bottom of section 1, carrying with them the mattress 11 so that said mattress will thus be held in a lowered position between the sides of section 1 and as shown in Figure 3. It is to be understood that a sleeping pad or cushion 20 is adapted to be supported by the spring bed bottom or mattress 11 and one or more pillows 21 can also be located thereon as shown. When the structure is collapsed or closed as shown in Figure 3 it is desirable to have the pillow 21 located at the forward end where the distance between the top and bottom of the unit is greater than at the rear end. When using the pillows, however, they are located at the rear or open end of the unit as shown in Figure 4.

Pivotally connected to each side of the top section or cover 2 adjacent to the rear end thereof is a hinge leaf 22 projecting from the upper end of a foldable prop 23, the lower end of which has a hinge leaf 24 projecting downwardly therefrom and pivotally connected to the adjacent side of the bottom section 1. The upper and lower sections 25 and 26 of each prop are joined by an elbow joint 27 whereby these prop sections can fold inwardly one upon the other when the top or cover section 2 is lowered onto the bottom section 1. As the hinge leaves 22 and 24 are pivotally joined to the upper and lower sections respectively, they do not interfere with the swinging movement of the top section 2 relative to the bottom section 1.

Secured to the lower member 26 of the folding props 23 are side cords 28 extending forwardly to the hinged end of the top section 2, these cords being passed through pulleys 28' attached to the flange 8 of the top section. A spring 28'' connects the ends of the side cords holding the cords taut at all times.

Side curtains 29 of suitable flexible material are attached at their upper and lower edges to the top and bottom sections 2 and 1 and are so shaped that when the unit is open, these side curtains are held taut. Eyelets or rings 30 are attached to the inner sides of the curtains and the cords 28 are extended through them. Thus when the props 23 are collapsed or folded inwardly, they will carry with them the rear end portions of the tensioned cords 28 with the result that these cords will move toward each other and draw with them the side curtains 29. Consequently the two curtains will be folded inwardly between the top and bottom sections of the unit and upon the lowered bed within the unit so that the curtains will not interfere with the prompt closing of the unit. Window openings 31 can be provided in the curtains 29, each opening preferably having a screen 32 secured thereacross and outside each window opening a curtain 32' is secured above the opening. These last named curtains are raised to open the windows by means of diagonally disposed cords 33 which are secured at their ends to the curtains close to the lower corners as shown at 33'.

Figure 6:
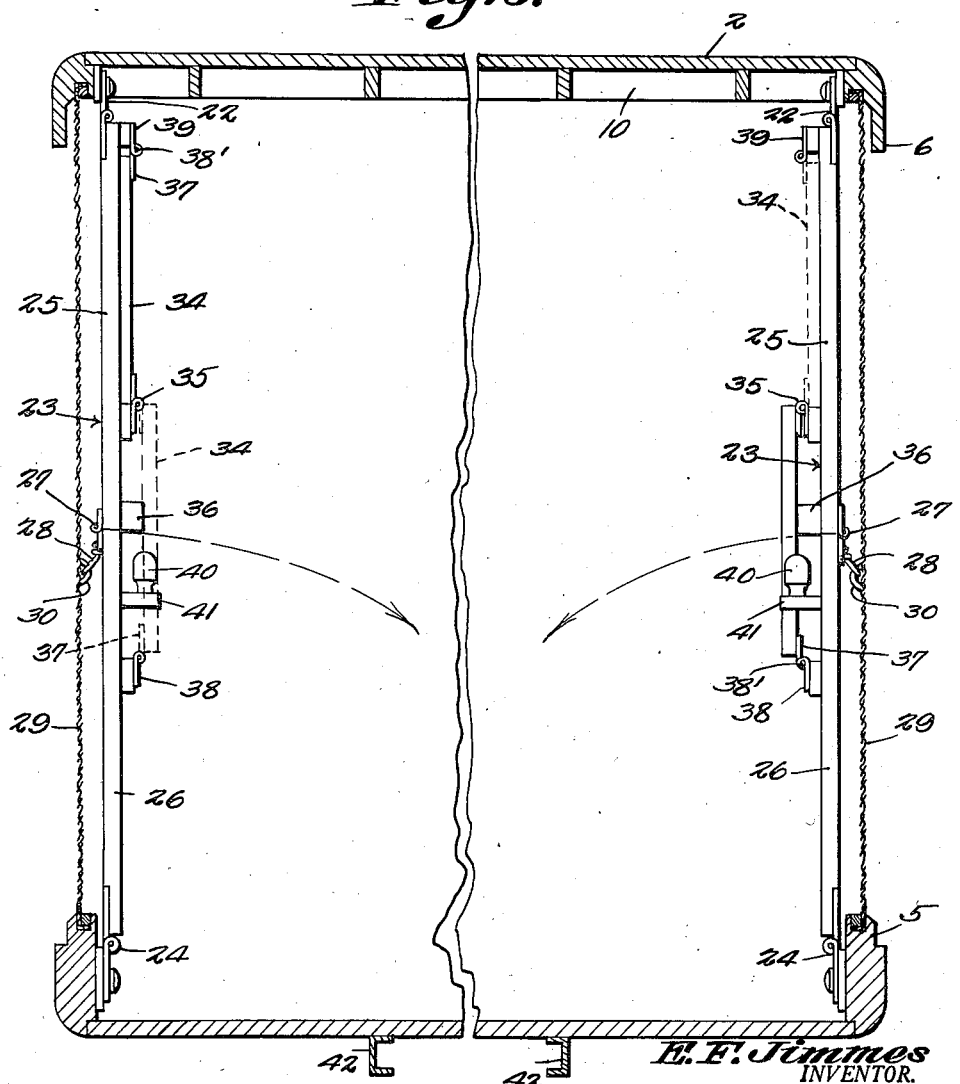
Figure 6 is a section on line 6—6, Figure 4, parts being removed and a portion broken away.

For the purpose of preventing collapse of the unit while in use, a locking bar 34 is hingedly connected at 35 to each of the members 25 of the props. This bar is adapted to swing downwardly across a spacing block 36 on member 25 adjacent to its joint 27 and it carries a coupling member in the form of a hinge leaf 37 which moves into register with a hinge leaf 38 secured to the other arm or member 26 of the prop. Thus a removable pintle can be inserted into the registering hinge members 37 and 38, thereby holding the bar 34 rigidly across the elbow joint of the prop and maintaining the prop rigid. The removable pintle has been indicated at 38'. When the bar 34 is not in use the hinge member 37 carried thereby registers with a hinge member 39 properly located on the arm or member 25 of the foldable prop 23 so that the pintle 38' can be inserted into the registering portions of the two hinge members 37 and 39 as shown in Figure 4. In Figure 6 the locking bars 34 have been shown by full lines in two different positions and by broken lines in their other positions.

A night lamp 40 can be mounted on a bracket 41 on each of the members 26 of the folding props, this lamp of course being connected in any suitable way to the car storage battery.

Secured to the bottom surface of the bottom section 1 are opposed angular rails 42 forming a guideway for a cross-head 43 slidable along the rails. This cross-head is hingedly connected at 44 to the top rail 45 of a step-ladder. The step-ladder is made up of an upper section 46 and a lower section 47, the two sections being connected by a hinge 48. Both sections have steps 49 and the lower ends of the lower section 47 are preferably slotted as at 50 so that when the ladder is set up for use at the back of a vehicle V, the slotted ends can straddle and bear downwardly on the rear bumper B of the vehicle. Section 47 has the hook member of a fastener, this member being indicated at 51 so that when member 47 is swung upwardly against the member 46, the hook member 51 can be engaged by a pivoted cam forming the other member 52 of the fastener. Thus the two members of the ladder can be secured together with one section below the other and when they are thus secured the sections can be slid forwardly between the rails so as to be supported thereby. This position of the ladder has been indicated in Figures 1 and 3. When the ladder is thus located that portion thereof where the hinge 48 is located can be secured by means of a hinged hasp 53 depending from the rear end of the bottom section 1 and adapted to move into engagement with a staple 54 extending from one of the steps 49 of the section 46. As the hasp 53 is carried by the rear end of section 2, it will be apparent that when this hasp is fastened to the staple or keeper in any suitable way, as by means of a padlock 55, the ladder will be secured in place and at the same time the top section 2 will be secured in closed position on the bottom section 1.

This berth can be mounted on the body in any manner desired. As shown in Figures 1 and 2 it can be supported by a frame 57 having downwardly diverging standards 58 suitably braced as at 59. These standards can engage any desired parts of the vehicle. For example the rear standards 58 can be attached to the sides of the rear bumper while the forward standards 58 can be secured to the forward ends of the running-boards R.

A handle 63 can be connected to the rear end of the top section 2 to facilitate opening the berth.

Normally the parts are all collapsed between the top and bottom sections of the berth as shown in Figure 3 at which time the side curtains are folded inwardly toward each other and the bars 34 are positioned as shown by full lines in Figure 4, they being held by the removable pintles 38'. Also the mattress 11 is in its lowermost position as shown in Figure 3.

When it is desired to use the structure, the hasp 53 is unfastened, thereby unlocking the top section 2 and the ladder. The ladder is then pulled rearwardly until the cross-head 43 reaches its rearmost position between the rails 42. The fastening members 51 and 52 are then separated and the ladder straightened out and lowered so that the lower ends of the section 47 will rest on bumper B. The user then ascends the ladder and swings the top section 2 upwardly. This action will result in moving the cords 28 apart with the result that the side curtains will be unfolded and ultimately drawn taut. The props will be straightened out by this action and bars 34 are then detached at their upper ends by withdrawing the pintles 38' from the hinge members 39 after which the bars are swung downwardly and attached to the hinge members 38. Thus collapse of the props is avoided.

The mattress is then pulled upwardly and backwardly toward the open end of the berth and this will cause the legs 12 to swing upwardly and backwardly to upright positions and until the latch 16 drops into engagement with its keeper 17. The mattress is thereby supported in raised position. Thereafter, if desired, a rolled curtain, such as indicated at 64 can be set up across the upper part of the open end of the berth, the same being mounted on suitable supports 65 extending from the curtains 29.

When the berth is not to be used and the vehicle is to be moved, the foregoing operations can be reversed, it being obvious that the entire structure thus can be quickly collapsed and the parts restored to their normal positions.

As shown in Figure 4 the cover 66 of oil-cloth or the like can be supported by a roller 67 located transversely within the forward portion of the lower section 1. This cover can be unwound and pulled over the bed to protect the bedding from moisture.

What is claimed is:

1. A sleeping berth including upper and lower box-like sections hingedly connected at one end, the upper section constituting a closure for the lower section, curtains connected to the upper and lower sections at the sides thereof, inwardly foldable props connected to the upper and lower sections adjacent to those ends thereof removed from the hinged ends of the sections, and means operated by the folding of the props between the sections for folding the curtains between the sections.

2. A sleeping berth including upper and lower box-like sections hingedly connected at one end, the upper section constituting a closure for the lower section, curtains connected to the upper and lower sections at the sides thereof, inwardly foldable props connected to the upper and lower sections adjacent to those ends thereof removed from the hinged ends of the sections, and means operated by the folding of the props between the sections for folding the curtains between the sections, said means including flexible connections between the props and the hinged end of one of the sections and means for attaching the curtains to said flexible connections.

3. A sleeping berth including upper and lower box-like sections hingedly connected at one end, the upper section constituting a closure for the lower section, curtains connected to the upper and lower sections at the sides thereof, inwardly foldable props connected to the upper and lower sections adjacent to those ends thereof removed from the hinged ends of the sections, and means operated by the folding of the props between the sections for folding the curtains between the sections, each of said props including upper and lower hingedly connected members and cooperating means on the members for holding said members in alinement when the upper section is in its raised position.

4. A sleeping berth including upper and lower box-like sections, said upper section constituting a closure for the lower section, a hinged connection between the sections at one end, curtains connected to the upper and lower sections at the sides thereof and constituting side closures when the upper section is swung upwardly relative to the lower section, props connecting the sides of the upper and lower sections, each prop comprising hingedly connected members foldable together between the sections, and means controlled by the folding of the props for folding the side curtains between the sections when the top section is moved to closed position.

5. In a sleeping berth for motor vehicles a bottom section, said bottom section being supportable on a motor vehicle and over the top thereof, a top section hingedly connected at its front end to the bottom section and constituting a cover therefor, side curtains connected at their upper and lower edges to the top and bottom sections respectively, foldable props interposed between and hingedly and pivotally connected to the upper and lower sections, said props when extended constituting supports for the top section and, when folded, being positioned between the sections, flexible connections between the forward end of the top section and intermediate portions of the respective props, and means for attaching the curtains to the flexible connections, said props and connections constituting means for folding the curtains toward each other and between the sections when the props are folded.

6. In a sleeping berth mountable on a vehicle body, a bottom section, a cover section hingedly connected to the back end of the bottom section constituting a closure therefor, said sections cooperating to provide a closed container of greater height at the front end than at the rear end, means for propping the top section in raised or open position, said means being foldable between the sections when the sections are closed together, and means operated by the upward movement of the top section for closing the side faces between said sections.

7. In a sleeping berth mountable on a vehicle body, a bottom section, a cover section hingedly connected to the back end of the bottom section constituting a closure therefor, said sections cooperating to provide a closed container of greater height at the front end than at the rear end, a means for propping the top section in raised or open position, said means being foldable between the sections when the sections are closed together, side curtains connecting the upper and lower sections and constituting closures for the sides of the berth, and means operated by the movement of the top section to closed position for folding the curtains between the sections.

EARL F. JIMMES.